United States Patent
Reisinger

(10) Patent No.: US 10,751,819 B2
(45) Date of Patent: Aug. 25, 2020

(54) METHOD FOR MANUFACTURING A STATOR OR MACHINING THE INNER WALL OF A STATOR

(71) Applicant: 3 S SCHNECKEN + SPINDELN + SPIRALEN BEARBEITUNGSGESELLSCHAFT M.B.H., Roitham (AT)

(72) Inventor: Walter Reisinger, Laakirchen (AT)

(73) Assignee: 3 S Schnecken + Spindeln + Spiraten Bearbeitungsgesellschaft m.b.H., Roitham (AT)

( * ) Notice: Subject to any disclaimer, the term of this patent is extended or adjusted under 35 U.S.C. 154(b) by 55 days.

(21) Appl. No.: 15/559,301

(22) PCT Filed: Sep. 9, 2015

(86) PCT No.: PCT/AT2015/050220
§ 371 (c)(1),
(2) Date: Sep. 18, 2017

(87) PCT Pub. No.: WO2016/145462
PCT Pub. Date: Sep. 22, 2016

(65) Prior Publication Data
US 2018/0065193 A1    Mar. 8, 2018

(30) Foreign Application Priority Data
Mar. 18, 2015   (AT) ............................... A 50220/2015

(51) Int. Cl.
*B23G 1/32*     (2006.01)
*B23G 1/08*     (2006.01)
(Continued)

(52) U.S. Cl.
CPC ................. *B23G 1/32* (2013.01); *B23G 1/08* (2013.01); *B23G 1/225* (2013.01); *B23F 15/08* (2013.01);
(Continued)

(58) Field of Classification Search
CPC . B23G 1/08; B23G 1/225; B23G 1/32; B23G 5/005; B23G 2240/12; B23G 2210/04; Y10T 409/300504
See application file for complete search history.

(56) References Cited

U.S. PATENT DOCUMENTS 1,361,098 A * 12/1920 Richards .................. B23G 1/32
                                                      409/73
1,804,686 A *  5/1931 Hall ......................... B23G 1/32
                                                      279/4.06
(Continued)

FOREIGN PATENT DOCUMENTS

CN      204135346 U    2/2015
CN      101 147 989 A  4/2016
(Continued)

OTHER PUBLICATIONS

International Search Report of corresponding International Application PCT/AT2015/050220, dated Apr. 29, 2016 (four pages).

*Primary Examiner* — Eric A. Gates
(74) *Attorney, Agent, or Firm* — Kilpatrick Townsend & Stockton LLP

(57) ABSTRACT

Disclosed is a method for manufacturing a stator for an eccentric screw motor where at least two milling heads are used for machining the inner wall of the stator tube, wherein, at the start of the machining, one of the milling heads is brought to a predetermined position near the stator with respect to the end of the stator tube, the milling head is fed into the tube interior along its linear axis from this predetermined position, and a thread is machined until the milling
(Continued)

head reaches at least the longitudinal center of the stator tube or exceeds a predetermined value, and the second milling head starts its machining of the inner wall surface of the stator tube at this point, wherein the milling head is moved along its linear axis and rotated about its rotary axis until the milling head reaches the centre of the stator tube.

9 Claims, 3 Drawing Sheets

(51) Int. Cl.
    *B23G 1/22*     (2006.01)
    *B23F 15/08*     (2006.01)

(52) U.S. Cl.
    CPC . *B23G 2240/12* (2013.01); *Y10T 409/300504* (2015.01); *Y10T 409/304032* (2015.01)

(56) References Cited

U.S. PATENT DOCUMENTS

| | | | | |
|---|---|---|---|---|
| 2,081,275 A * | 5/1937 | Hall | ............ | B23G 1/32 409/73 |
| 2,526,762 A * | 10/1950 | Miller | ............ | B23B 5/163 407/24 |
| 2,551,331 A * | 5/1951 | Miller | ............ | B23B 5/165 29/65 |
| 2,688,144 A * | 9/1954 | Berkey | ............ | B23G 1/225 269/218 |
| 3,354,482 A * | 11/1967 | Anderson | ............ | B23G 1/08 408/129 |
| 5,358,360 A * | 10/1994 | Mai | ............ | B23Q 11/1084 279/20 |
| 5,779,402 A * | 7/1998 | Kameda | ............ | B23Q 11/006 408/56 |
| 6,059,702 A * | 5/2000 | Winkler | ............ | B23Q 3/157 408/56 |
| 6,135,862 A * | 10/2000 | Ukai | ............ | B23Q 11/0042 409/136 |
| 6,474,914 B1 * | 11/2002 | Lang | ............ | B23Q 5/043 408/124 |
| 7,674,079 B2 * | 3/2010 | Schawe | ............ | B23G 1/02 29/33 T |
| 8,784,022 B2 * | 7/2014 | Leishman | ............ | B23Q 11/10 409/136 |
| 9,015,915 B1 * | 4/2015 | Soltys | ............ | B23P 23/02 29/33 T |
| 9,238,287 B2 * | 1/2016 | Gardner | ............ | B23Q 11/1076 |
| 2007/0014647 A1 * | 1/2007 | Watzke | ............ | B23B 31/02 409/136 |
| 2012/0294687 A1 | 11/2012 | Wilmot | | |

FOREIGN PATENT DOCUMENTS

WO      2010/049724 A2      5/2010
WO      2011095823 A1      8/2011

\* cited by examiner

METHOD FOR MANUFACTURING A STATOR OR MACHINING THE INNER WALL OF A STATOR

This application is a U.S. National Phase of International Application No. PCT/AT2015/050220, filed Sep. 9, 2015, which claims priority to Austrian Patent Application No. A50220/2015, filed Mar. 8, 2015, the disclosures of which are incorporated by reference herein.

The invention relates to a method according to the preamble of claim 1 as well as a device according to the preamble of patent claim 10.

The principle (Moineau principle) of an eccentric screw motor based on a rotor rotating in a helically-shaped tube lined with elastomer and with a special inner contour as the stator. As a result of a different number of pitches of the rotor and stator (rotor pitch number=stator pitch number−1), there is a pressure build-up caused by opening and closing the chambers resulting from the different numbers of pitches. Today, the standard stator, is a tube 60 with a cylindrical outer diameter and an inner contour lined with an elastomer layer 22 applied by means of rubber injection moulding technology as shown schematically in FIG. 1. Upon operation, for example in the context of a drill motor, this results in high pressures on the flanks of the internal geometry due to the pressure build-up and by the torque which is necessary to drive the drill bit.

Due to the different wall thickness, wherein the wall thickness of the elastomer layer on the "mountain" is higher than in the "valley", the applied elastomer layer can only withstand pressures from approximately 24 to 40 bar. At higher pressures the elastomer shifts. Cracks occur in the elastomer leading to performance degradation and destruction of the inner lining of the stator. To change or to improve this reaction, there are stators, which already feature a preformed, metallic internal geometry and are lined with a substantially thinner layer of elastomer having a constant thickness or constant wall thickness, as shown schematically in FIG. 2. Thus it is possible to increase the pressure on the flanks, as the resistance of the metal at the base of the elastomeric layer allows this over the whole geometry and, in particular, at the edges, but without loss of torque or performance. This technology involves pressing a tube 60 in the appropriate form and thus producing the internal contour and then applying the elastomeric layer 22. This has the disadvantage that individual spinning tools must be made for each different internal geometry or pitch.

The aim of the invention is to create a simple but precise method and a simply constructed apparatus, enabling the rapid and accurate manufacture of stators for eccentric screws or eccentric screw motors. Furthermore, the high costs of spinning tools are eliminated. It should also be possible to produce various internal geometries using only one milling tool and replaceable milling inserts, wherein the various internal geometries are produced by machining.

According to the invention, a method of the aforementioned type is characterised in that at least two milling heads are used for machining the inner wall of the stator tube, and at the beginning of the machining, one of the milling heads approaches the stator and takes up a predetermined position with respect to this end of the stator tube, the milling head accelerates to its machining speed from this predetermined position with respect to its rotary axis and with respect to its linear axis, and runs along its linear axis inside the tube in order to form a thread, until the milling head reaches at least the longitudinal centre of the stator tube or a predetermined value, the exit point or the exit contour of the convolutions of this thread or another thread to be formed by this milling head at the other opposite end of the stator tube is determined or calculated as a function of the course of the individual threads and the position of the milling head and/or the point of contact on the stator tube, and that the second milling head starts its machining of the inner wall surface of the stator tube at this point, and that the milling head is moved along its linear axis and rotated about its rotary axis until this milling head reaches the centre of the stator tube or exceeds a predetermined value, and the thread formed by the respective milling head as far as the middle of the thread to be formed, is continued by the respective other milling head in the respective other half of the stator tube, and is milled from the centre to the respective other end.

The inventive method offers particular advantages when a stator being machined, as it is arranged that the inner contour has a ratio V of the length L to the diameter D where V=L:D≥30:1, preferably ≥40:1.

Machining of the stator tube, wherein the two milling heads are not interrupted, is effected when, during the movement of the one milling head inside the stator tube to the longitudinal centre, the other milling head is moved in the same direction as the first milling head as it is moved outwards from the stator tube. This naturally also applies vice versa.

Because the machining of a thread sometimes requires a large number of milling operations, it is advantageous if, upon each movement outwards of a milling head, the thread previously milled or machined, is machined during the movement inwards of this milling head.

As the middle of the stator tube has to be accurately machined, and the surface transitions of the respective milled halves of each thread are to be produced, it can be inventively provided that during each inwards or outwards movement of a milling head, half the length of a thread, possibly augmented by at least a length corresponding to 50% of the height or width of a thread, is milled, or that the respective milling head in the stator tube is moved outwards from the tube longitudinal centre by a maximum value of 50% of the height or width of the machined thread.

In order to ensure as speedy a machining as possible without milling interruption, it is expedient if, upon the second milling head reaching the tube longitudinal centre, the first milling head is returned to its starting position for the next milling operation along with a further inwards movement into the stator tube in order to form a further thread or for further machining of the same thread, and is positioned in front of the end of the tube and, upon inwards movement of the first milling head into the stator, the second milling head is moved towards the other end of the tube opposite the first milling head, or outwards from the tube.

In order to achieve a rapid, continuous and precise machining of the stator tube material, it can be provided that during the respective outwards movement of the first and/or second milling head from the stator tube, the thread flank or side opposite the thread flank or side formed during the inwards movement of the respective milling head in the stator, is machined or milled.

As a function of the shape of the threads, their number and the material of the stator tube, it may be provided that, the speeds of the axes is kept the same and/or the milling heads are moved optionally with constant and/or the same rotational speed and/or feed rate and/or are moved simultaneously in the same direction, and/or the milling heads are alternately moved inwards into the stator tube from the tube ends.

When using the stator tube according to the invention, it has proved to be advantageous if the circular periphery of the stator tube is kept unchanged during machining.

Furthermore, it has proved to be advantageous if an elastomer layer of a uniform thickness is applied to the inner wall surface of the stator tube after the formation of the threads.

In particular, if the pitch of the threads varies over the tube length, it can be provided that the two milling heads may be driven independently of one another, while the two milling heads or the tool holders carrying the milling heads may be independently driven with respect to the speed along the longitudinal axis and/or the rotary axis and/or the milling speed.

A device of the type mentioned above is characterised in that
two milling heads are provided for machining the inner wall of the stator tube and are preferably independently controllable and adjustable and rotatable via a control unit, and
the control unit is arranged:
to move one of the milling heads close to the stator tube, and to adjust it into a predetermined position with respect to the tube end,
to accelerate the milling head to a machining speed from this predetermined position with respect to its rotary axis and with respect to its linear axis, and to move it inwards along its linear axis inside the tube in order to machine a thread until the milling head reaches at least the longitudinal centre of the stator tube or exceeds a predetermined value,
wherein the exit point or the exit contour of the convolutions of this thread or another thread to be formed by this milling head at the other opposite end of the stator tube is determined or calculated as a function of the course of the individual threads and the position of the milling head and/or the point of contact on the stator tube, and that the second milling head starts its machining of the inner wall surface of the stator tube at this point, and that the milling head is moved along its linear axis and rotated about its rotary axis until this milling head reaches the centre of the stator tube or exceeds a predetermined value, and
to continue or further mill the respective formed thread with the other milling head in the other half of the stator tube.

This device is simply and reliably constructed, works efficiently and is based on known elements. Appropriately it is provided that the milling head is carried by a tool holder which carries a tool drive and/or a centering device and/or a support device and/or a chip outlet and/or a coolant supply.

It is advantageous if the tool holder comprises a ring that can be used for the stable hydraulic guidance of the milling head, possibly via a supporting cone on the inner wall surface of stator tube.

It is also advantageous if the coolant is supplied via the drive train of the milling head, and the outlet opening for the coolant lies directly next to the milling head.

For faster machining, it may be provided that each milling head comprises a number of milling heads juxtaposed on a carrier, in order to machine or mill the same thread simultaneously.

Exemplary, but non-limiting, embodiments of the invention based on the drawings are explained in detail below:

Figure 1:
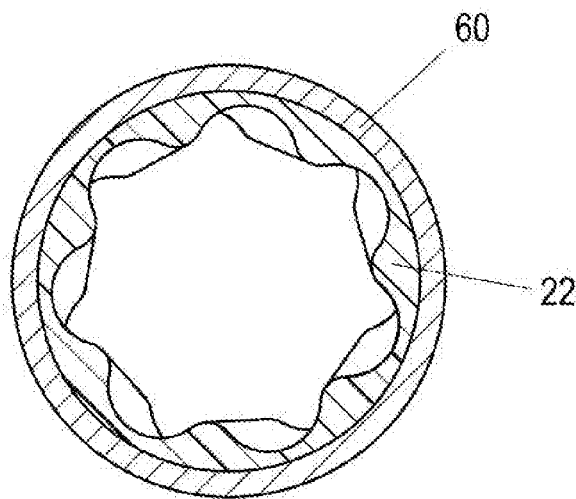
FIGS. 1 and 2 show schematic views of known stator tubes.
Figure 2:
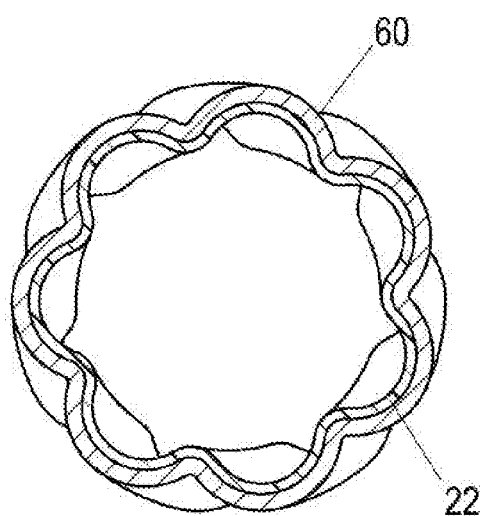
Figure 3:
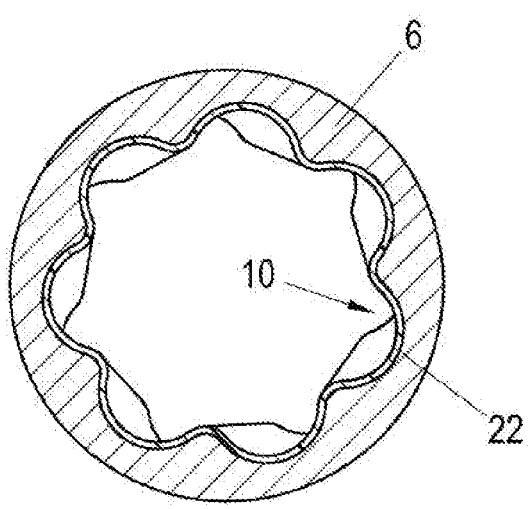
FIG. 3 shows a view of a stator tube formed according to the invention.
Figure 4:
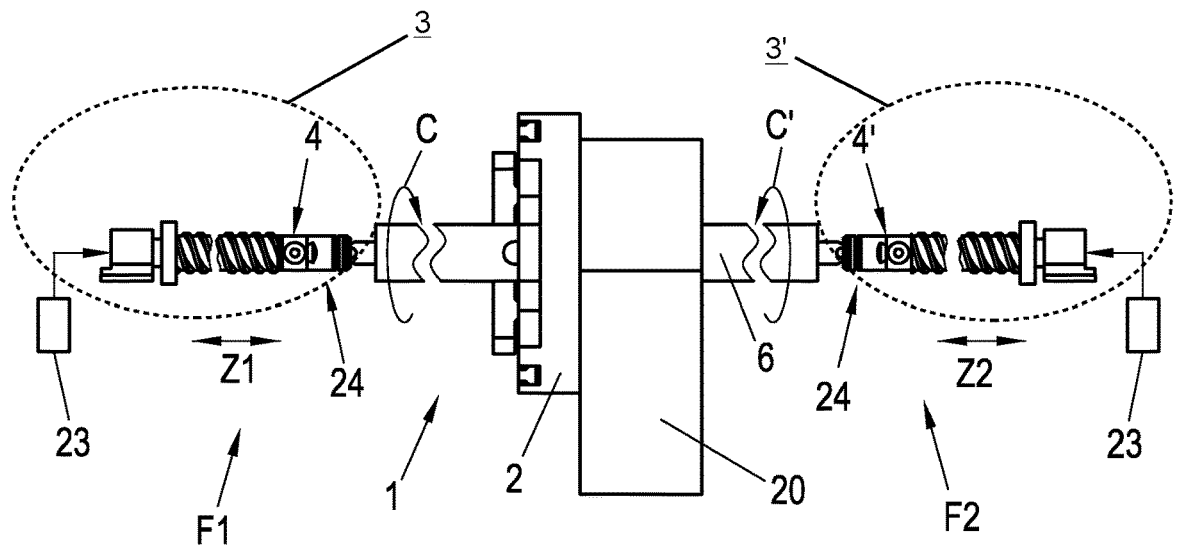

FIG. 4 schematically shows a machining machine or device according to the invention.

Figure 5:
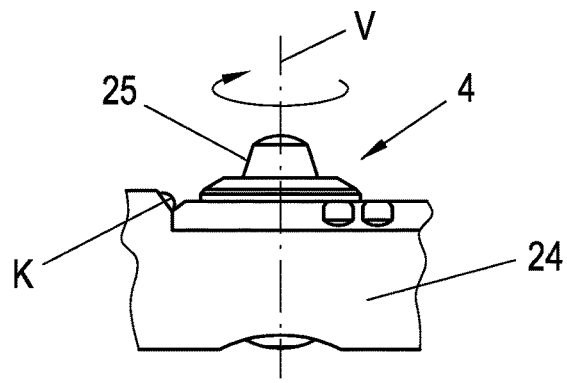

FIG. 5 shows a milling head.

Figure 6:
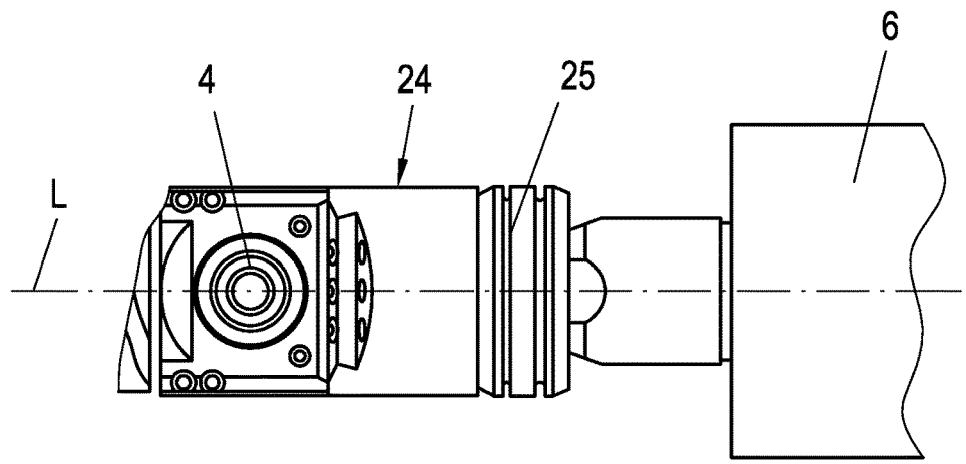

FIG. 6 shows a tool holder.

Figure 7:
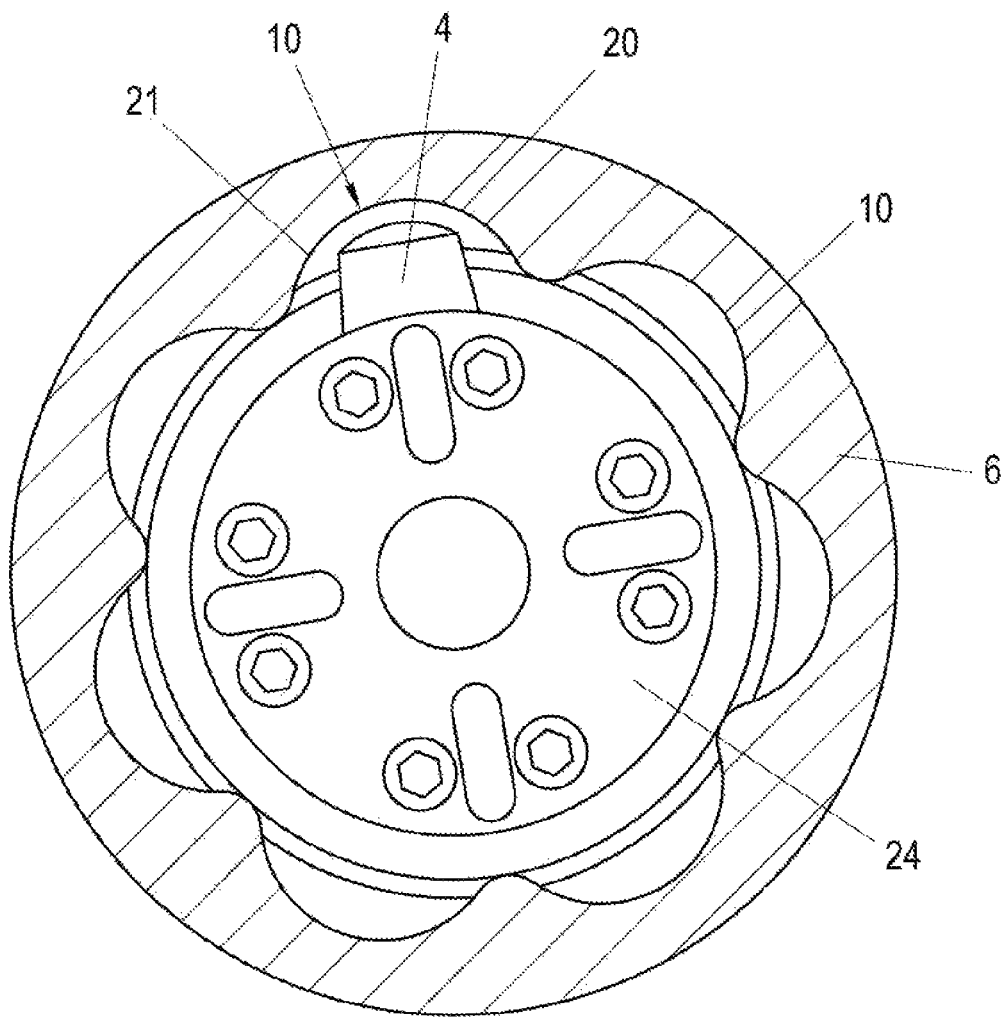

FIG. 7 schematically shows a milling head inside or in front of the end surface or opening of a stator tube.

At the start of manufacturing of a stator, a prefabricated metal tube with the finished length of the component, for example 6000 mm, is introduced into a machining machine 1 and centrally clamped by a chuck 2. The machining machine 1 comprises respectively on both sides of the chuck 2 or its carrier 20 a milling tool 3, 3' which carries a milling head 4 in its front end region close to the workpiece. The axis of rotation V of the milling head 4 protrudes laterally from a tool holder 24, which is adjustable and rotatable about its longitudinal axis L in the longitudinal direction of the tube 6. FIG. 4 shows the basic structure of a machining machine 1.

The machining machine or device 1 according to the invention comprises a carrier 20 or a frame 20, which carries a chuck 2, in which the stator tube 6 to be machined can be firmly clamped. Milling stations F1, F2 are formed on both sides of the carrier 20, wherein each has a tool holder 24 carrying a milling head 4, 4'. The milling heads 4, 4' arranged on the tool holder 24 are shown schematically in greater detail in FIG. 5. This shows milling heads attachable to a rotating drive which can rotate them about its rotational axis V. The tool holder 24 of the milling head 4 is movable along a longitudinal axis Z1, while the tool holder 24 for the milling head 4' is movable along a longitudinal axis Z2, allowing the clamped stator tube 6 to be displaced linearly in the longitudinal direction. At the same time, the milling heads 4, 4' carried by the tool holders 24 with the respective tool holder 24 can be rotated about a rotary axis C, C' or the longitudinal axis of the stator tube 6, so that a helical thread 10 can be milled inside the stator tube 6 by the milling heads 4, 4'. The rotational speed of the milling heads 4, 4' can be controlled by means of the schematically illustrated control unit 23, or the tool holder 24 along the axes Z1, Z2 and only the rotary axes C, C' moved or adjusted. FIG. 4 shows the milling heads 4, 4' in their starting position, i.e. in a position before the start of machining of a stator tube 6 clamped in the carrier 20.

The manufacturing process is, for example, as follows:

Each milling tool 3, 3' comprises a tool holder 24, a tool drive, a centering device, a chip outlet, a coolant supply and the milling head 4, and is initially moved close to the tube 6 or its end face or inserted in the tube 6 until the milling head 4 is at a predetermined distance from the tube 6, as shown in FIG. 4.

An inner ring 25 that is also carried by the tool holder 24 is then hydraulically applied to the inner wall of the tube 6, to ensure stable guidance of the milling head 4 inside the tube 6. Further, the coolant supply, which is guided via the drive train or the tool holder 24 directly past the milling head 4, is brought into operation.

Thereafter, the CNC rotary axis C and the CNC linear axis Z1 is brought into operation, in particular at the same time, and given the pitch direction and the pitch angle of the thread 10 to be formed. The milling head 4 is accelerated to machining speed.

The tool holder 24 with the milling head 4 now moves at a constant feed rate along the axis Z1+ in the tube 6, and the milling head 4 thereby forms part of the thread 10 to be produced in the tube 6, for example a part of the flank 20 or 21 of the thread 10.

The path which the milling head 4 travels during manufacture depends on the tube length, the milling diameter, the distance of the milling head 4 to the tube end before commencing milling, and the tolerance. Thus the path of the milling head 4 may be calculated as follows:

Workpiece length: 6000 mm
Milling diameter: 20 mm
Distance of milling head to workpiece: 10 mm
Tolerance: 10 mm $$\text{Axis } Z1 - \frac{6000}{2} + \frac{20}{2} + 10 + 10 - 3030 \text{ mm}$$

After reaching the calculated or predetermined starting point of the milling head 4 to commence milling, the axis Z1 stops. The axis C is rotated until the milling head 4 contacts or lies in front of the end face or the inner wall surface of the tube 6 in the region of the flank 20 of the thread 10 to be formed or machined. The starting point of this thread 10 is selected or specified. Alternatively, it may be provided that a prefabricated thread 10 is already present in the tube 6 to be milled before commencing milling.

Based on this contact point located in the end region of the tube 6, there results a defined exit point of the thread 10 at the end face II, i.e. the opposite end face of the tube 6 on a secondary imaginary spiral line in the tube, which corresponds to the thread to be formed.

Thereafter, the axis Z1– and the axis C start with a predetermined direction of rotation and constant feed and move the milling head and its tool holder 24. If the milling head 4 overshoots the centre of the tube or by a predetermined amount, it is turned off or moved out of the tube 6 again.

FIG. 6 schematically shows a tool holder 24 carrying a milling head 4. The cooling fluid conduit and the chip output unit are carried in the tool holder 24. The tool holder 24 can be supported on the inner wall of the stator tube by means of the supporting part or the inner ring 25.

FIG. 7 shows a schematic section through a stator tube 6 with a tool holder 24 in section, wherein the milling head 4 is in a position at which it is placed against the flank 20, 21 of an already partially machined thread 10, or to which the milling head 4 is moved following a milling operation as a starting point for a further milling process.

If the axes Z1 and C have each travelled the minimum path which results from the matching of the determined or calculated spiral line at Point II, then the milling head 4 with its axis Z2 is moved to the left in FIG. 4 in fact with the same speed as the axis Z1. When the tool holder 24 with the milling head 4 with the axis Z1 reaches its starting point, the axis Z1 is stopped and waits until the tool holder 24 with the milling head 4' with the axis Z2 and the rotary axis C' reaches its inner position, and is rotated with the axis C' to the position β or has reached the flank 21 of the thread 10, and has travelled with the axis Z2 until that point is reached, travels this time in the opposite direction on a predetermined secondary spiral line to the flat surface I at the left end of the tube.

This principle is now repeated until all threads have been machined multiple times and the chip volume and the geometry of the profile prevents entire machining by a milling tool 4, 4' in one step. Thus, as many surface milling passes are performed with the milling heads 4, 4', possibly with different geometries, as are necessary to achieve the desired profile and number of passes.

All movements of the milling heads 4, 4' are controlled by the control unit 23. The linear axis and rotary axis of the respective milling head 4, 4' correspond to the longitudinal axis and rotary axis of the tool holder 24 carrying the respective milling head 4, 4' in its movement relative to the stator 6.

The invention claimed is:

1. A device for machining a stator tube comprising:
a chuck, configured to receive and hold the stator tube;
two movable milling heads, comprising a first milling head and a second milling head, positioned on opposite ends of the chuck, and
a control unit configured to control the two movable milling heads to machine the stator tube by:
first moving the first milling head to a first position relative to the chuck;
accelerating the first milling head to a first machining speed after moving the first milling head to the first position;
moving the first milling head at the first machining speed along a first linear axis relative to the stator tube to a first predetermined point, to form a first interior thread;
determining an exit point of the first interior thread;
moving a second milling head to a second position on the opposite side of the stator tube based on the determined exit point of the first interior thread;
accelerating the second milling head to a second machining speed, after moving the second milling head to the second position;
moving the second milling head along a second linear axis relative to the stator tube to a second predetermined point, to form a second interior thread;
wherein the first interior thread and the second interior thread form a continuous thread.

2. The device according to claim 1, wherein the control unit is configured to machine the stator tube, the stator tube having an inner wall surface is lined with an elastomer the stator tube having a dimension or inner contour with a ratio V of the length L to the diameter D of V=L:D≥30:1.

3. The device according to claim 1, wherein the first milling head and the second milling head are both supported by a tool-holder, both tool-holders comprising a tool drive and/or a centring device and/or supporting means and/or a chip outlet and/or a coolant supply.

4. The device according to claim 3 wherein each tool holder comprises an inner ring configured for stable hydraulic guidance of the milling head to the inner wall surface of the stator tube via a supporting cone.

5. The device according to claim 4, wherein the coolant supply is supplied via a drive train of the respective milling head, wherein an outlet opening for the coolant supply is located by the respective milling head.

6. The device according to claim 2, wherein the ratio V is greater than or equal to 40:1.

7. The device according to claim 1, wherein each of the two milling heads comprises a plurality of adjacent milling heads located on a carrier.

8. The device according to claim 1, wherein the first predetermined point and the second predetermined point are both at a longitudinal center of the stator tube.

9. The device according to claim 1, wherein the control unit is further configured to determine an exit contour of the first interior thread.

\* \* \* \* \*